(12) United States Patent
Hsieh et al.

(10) Patent No.: US 6,236,770 B1
(45) Date of Patent: May 22, 2001

(54) BATCH SCANNING METHOD OF AN IMAGE SCANNER

(75) Inventors: Chien-Shu Hsieh, Taoyuan Hsien; Shu-fang Chuang; Kung Cheng, both of Hsin-chu, all of (TW)

(73) Assignee: Mustek System Inc., Hsin-Chu (TW)

( * ) Notice: Subject to any disclaimer, the term of this patent is extended or adjusted under 35 U.S.C. 154(b) by 0 days.

(21) Appl. No.: 09/013,814

(22) Filed: Jan. 27, 1998

(51) Int. Cl.$^7$ .................................................. G06K 7/00
(52) U.S. Cl. ............................................................ 382/312
(58) Field of Search ................................... 382/309, 312, 382/313, 317, 318, 321; 395/795, 794; 358/505, 448, 471, 473

(56) References Cited

U.S. PATENT DOCUMENTS

| 4,914,709 | * | 4/1990 | Rudak | 382/309 |
| 5,649,222 | * | 7/1997 | Mogilevsky | 395/795 |

OTHER PUBLICATIONS

Microsoft Press, Computer Dictionary, Second Edition, Copyright@ 1994, p. 280.*

* cited by examiner

Primary Examiner—Jose L. Couso
Assistant Examiner—Duy M. Dang
(74) Attorney, Agent, or Firm—Winston Hsu

(57) ABSTRACT

The present invention relates to a scanning method of an image scanning system for scanning a plurality of designated areas. The system comprises a transparent platform having front, rear, left and right ends for placing documents, and a scanning module for scanning the designated areas within the platform in a front-to-rear direction. The scanning method comprises: (1) checking if any two or more designated areas are folded along a front-to-rear direction; if yes, separating each of the folded designated areas along a left-and-right direction into at least one folding section and possibly non-folding sections if there is any, and defining all the folded folding sections as one combined section; (2) using the scanning module to scan each non-folding designated area, non-folding section and combined section one by one along the front-to-rear direction and generating a corresponding digital image for each; and (3) generating a digital image for each folded designated area from the digital images of the non-folding and combined sections of the folded designated area.

9 Claims, 5 Drawing Sheets

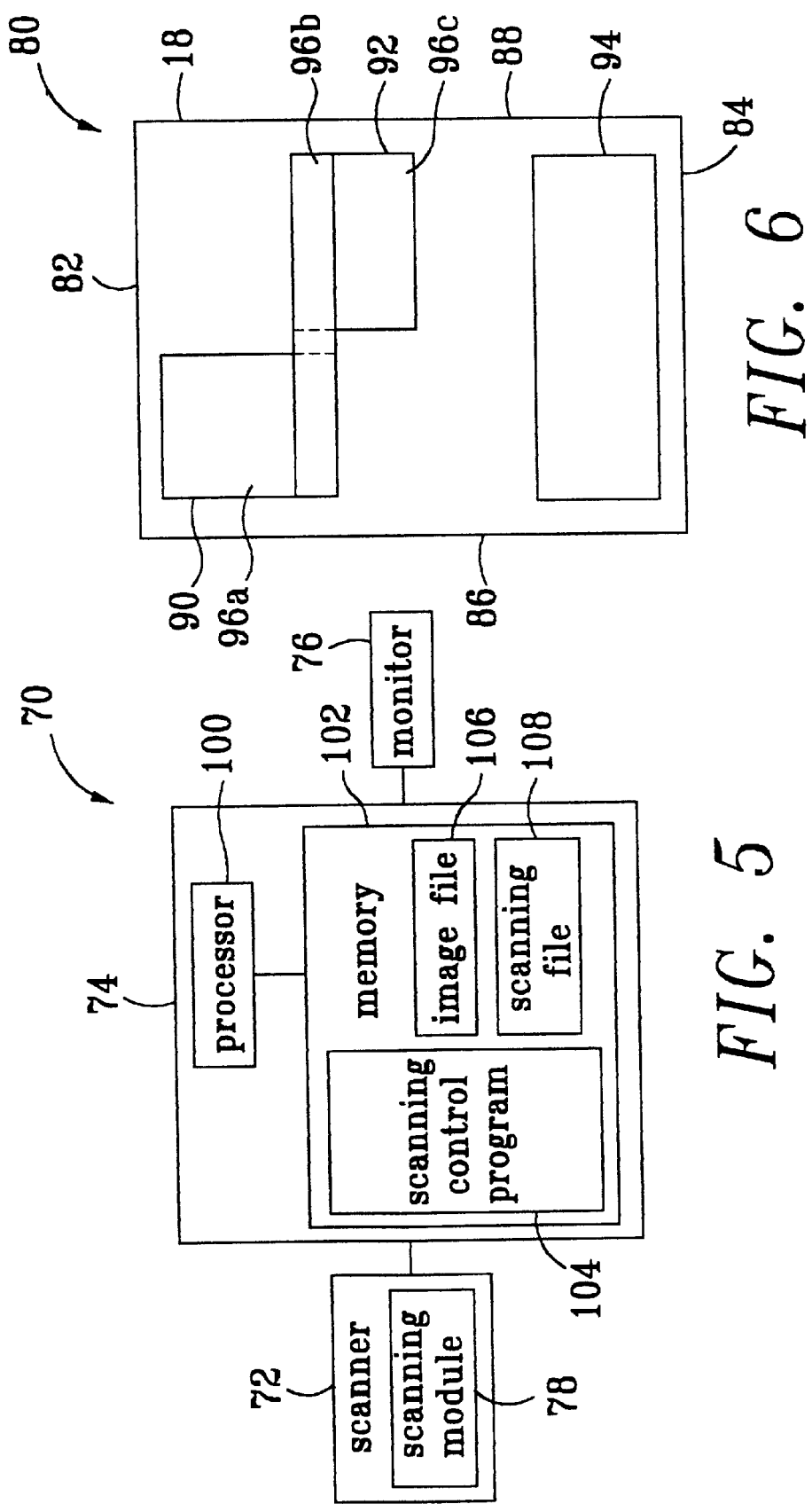

BATCH SCANNING METHOD OF AN IMAGE SCANNER

BACKGROUND OF THE INVENTION

1. Field of the Invention

The present invention relates to an image scanner, and more particular, to a batch scanning method of an image scanner for scanning a plurality of designated areas within a document.

2. Description of the Prior Art

Please refer to FIG. 1 and FIG. 2. FIG. 1 is a perspective view of a prior art image scanning system 10. FIG. 2 is a top view of the platform 18 of the image scanning system 10. The image scanning system 10 comprises a scanner 12, a computer 14, and a monitor 16 with a screen 22. The scanner 12 comprises a rectangular transparent platform 18 having a front end 24, a rear end 26, a left end 28, and a right end 30 for placing documents to be scanned, and a scanning module 20 installed under the platform 18 for scanning documents placed on the platform 18. During a scanning operation, the scanner 12 will make a preview scan over the documents placed on the platform 18, and generate a preview image on the monitor screen 22. A user can designate a plurality of non-folding areas such as the areas 32, 34 and 36, on the preview image and set various scanning parameters such as resolution, contrast, highlight, shadow, scanning mode, image mode, etc. for each designated area. The image scanning system 10 will then start a normal scan over the designated areas 32, 34 and 36.

Please refer to FIG. 3. FIG. 3 is a flowchart of a prior art scanning method 38 for scanning a plurality of designated areas over the platform 18 of the image scanning system 10.
Step 40: start scanning a document;
Step 42: designate at least one designated area, and set the scanning parameters of the designated area such as resolution, contrast, highlight, shadow, scanning mode, image mode, etc.;
Step 44: move the scanning module 20 to the designated area;
Step 46: scan the designated area;
Step 48: move the scanning module 20 to the front end 24 of the platform 18;
Step 50: check if there is any designated area which has not been scanned; if yes, go to step 42;
Step 52: complete the scanning process.

In the prior art scanning method 38, the scanning module 20 has to return to the front end 24 of the platform 18 after scanning one designated area. This method 38 is quite time-consuming.

Please refer to FIG. 4. FIG. 4 is a flowchart of another prior art scanning method 54 for scanning a plurality of designated areas over the platform 18 of the image scanning system 10.
Step 56: start scanning a document;
Step 58: rearrange the designated areas in a front-to-rear sequence;
Step 60: set the scanning parameters according to one leading designated area in the sequence which has not been scanned;
Step 62: move the scanning module 20 to the designated area;
Step 64: scan the designated area;
Step 66: check if there is any designated area in the sequence which has not been scanned; if yes, go to step 60;
Step 68: move the scanning module 20 to the front end 24 to complete the scanning process.

In the prior art scanning method 54, the designated areas are arranged in a front-to-rear sequence. When scanning a rear designated area immediately following a front designated area, the scanning module 20 will be moved from the ending position of the front designated area to the starting position of the rear designated area without returning to the front end 24 of the platform 18. Such design makes the scanning method 54 much faster than the scanning method 38. However, as shown in FIG. 2, the bottom edge of the designated area 32 is below the top edge of the designated area 34. Such condition is called the designated area 32 is folded with the designated area 34 along the front-to-rear scanning direction. After scanned the designated area 32, the scanning method 54 will make the scanning module 20 move back to the top edge of the designated area 34. Such backward movement of the scanning module 20 is quite difficult to control and will cause continuous change of the operating status of the scanning module 20 such as accelerating, decelerating, and stop. And such complicated movement control may cause the scanning module 20 to generate poor images.

SUMMARY OF THE INVENTION

It is therefore a primary objective of the present invention to provide a scanning method which can scan a plurality of designated areas over the platform of an image scanning system in a single pass so that the above mentioned problems of the prior art scanning methods can be solved.

In a preferred embodiment, the present invention provides a scanning method of an image scanning system for scanning a plurality of designated areas, the system comprising a transparent platform having front, rear, left and right ends for placing documents, and a scanning module for scanning the designated areas within the platform in a front-to-rear direction, the scanning method comprising:
(1) checking if any two or more designated areas are folded along a front-to-rear direction; if yes, separating each of the folded designated areas along a left-and-right direction into at least one folding section and possibly non-folding sections if there is any, and defining all the folded folding sections as one combined section;
(2) using the scanning module to scan each non-folding designated area, non-folding section and combined section one by one along the front-to-rear direction and generating a corresponding digital image for each; and
(3) generating a digital image for each folded designated area from the digital images of the non-folding and combined sections of the folded designated area.

It is an advantage of the present invention that the scanning module can scan a plurality of designated areas over the platform of an image scanning system in a single pass without having the scanning module return to the front end of the platform or to the beginning of another designated area.

These and other objectives of the present invention will no doubt become obvious to those of ordinary skill in the art after reading the following detailed description of the preferred embodiment which is illustrated in the various figures and drawings

BRIEF DESCRIPTION OF THE DRAWINGS

FIG. 5 is a function block diagram of an image scanning system according to the present invention.

FIG. 6 is a top view of the transparent platform of the image scanning system shown in FIG. 5.

DETAILED DESCRIPTION OF THE PREFERRED EMBODIMENT

Figure 1:
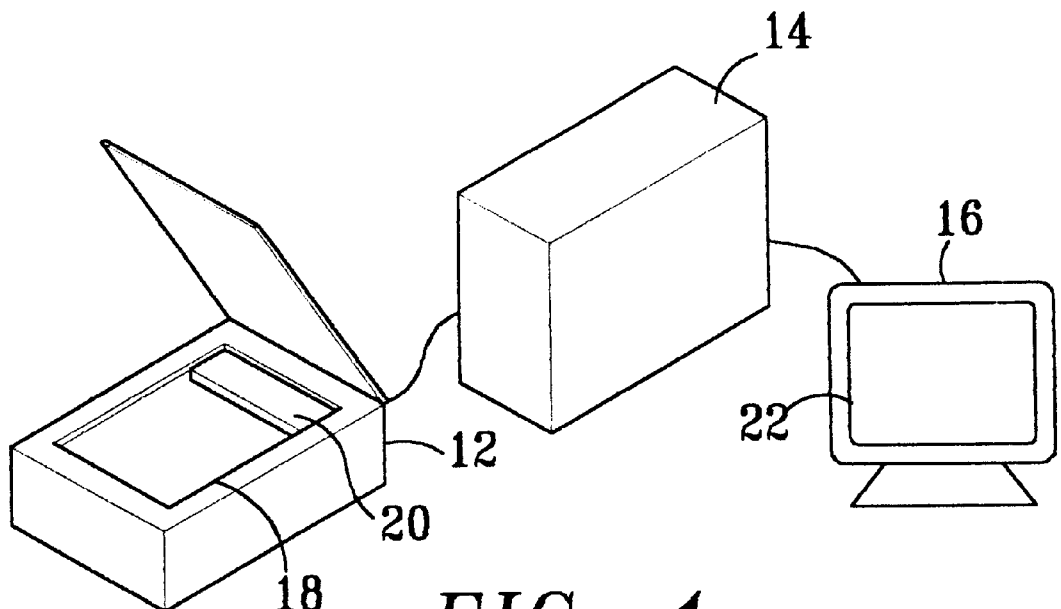
FIG. 1 is a perspective view of a prior art image scanning system.
Figure 2:
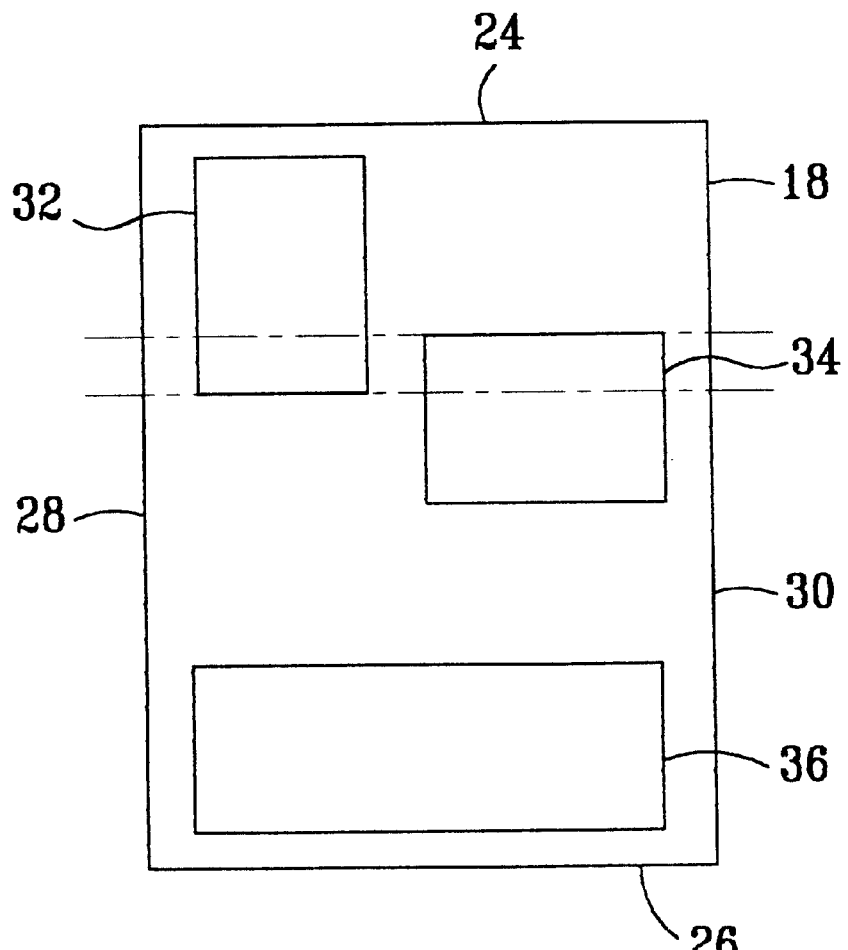
FIG. 2 is a top view of the transparent platform of the image scanning system shown in FIG. 1.
Figure 3:
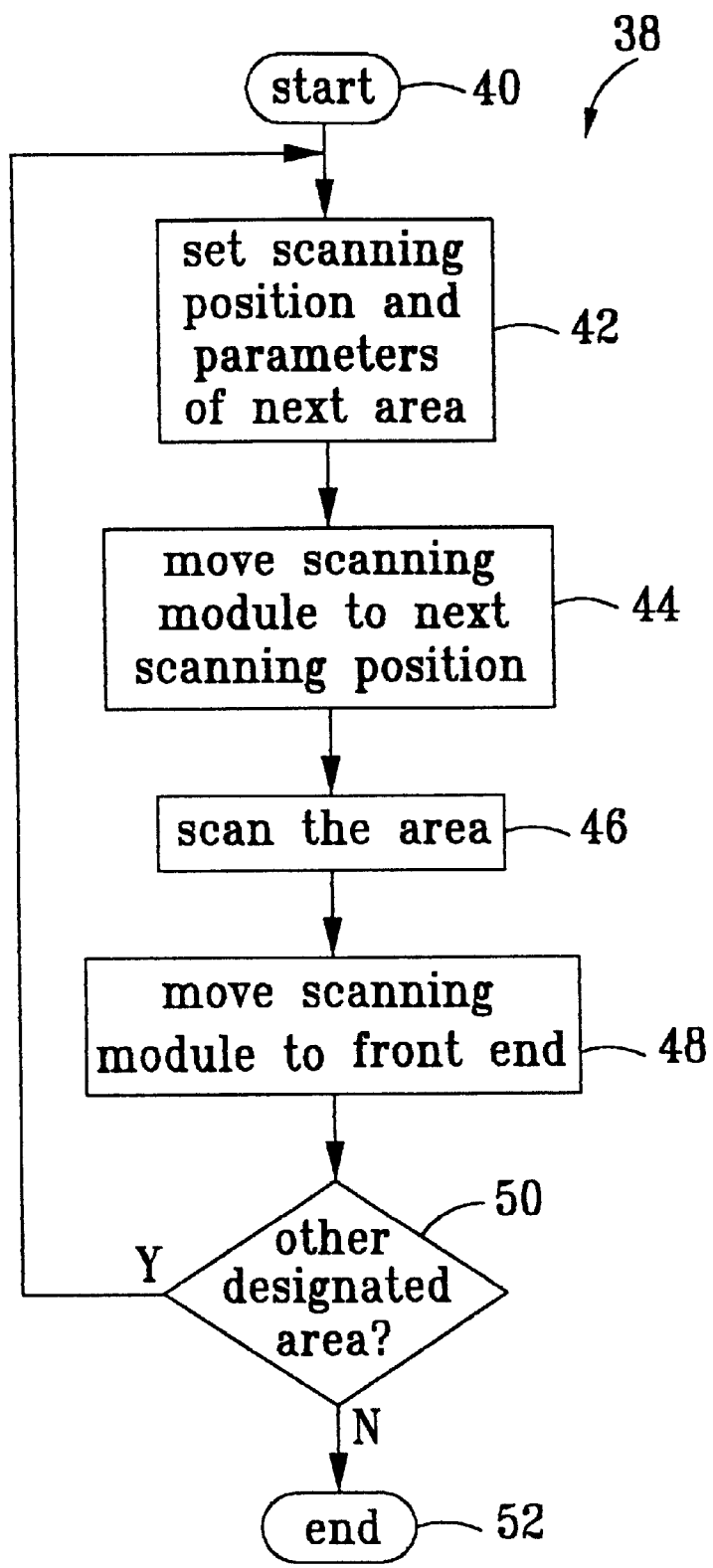
FIG. 3 is a flowchart of a prior art scanning method.
Figure 4:
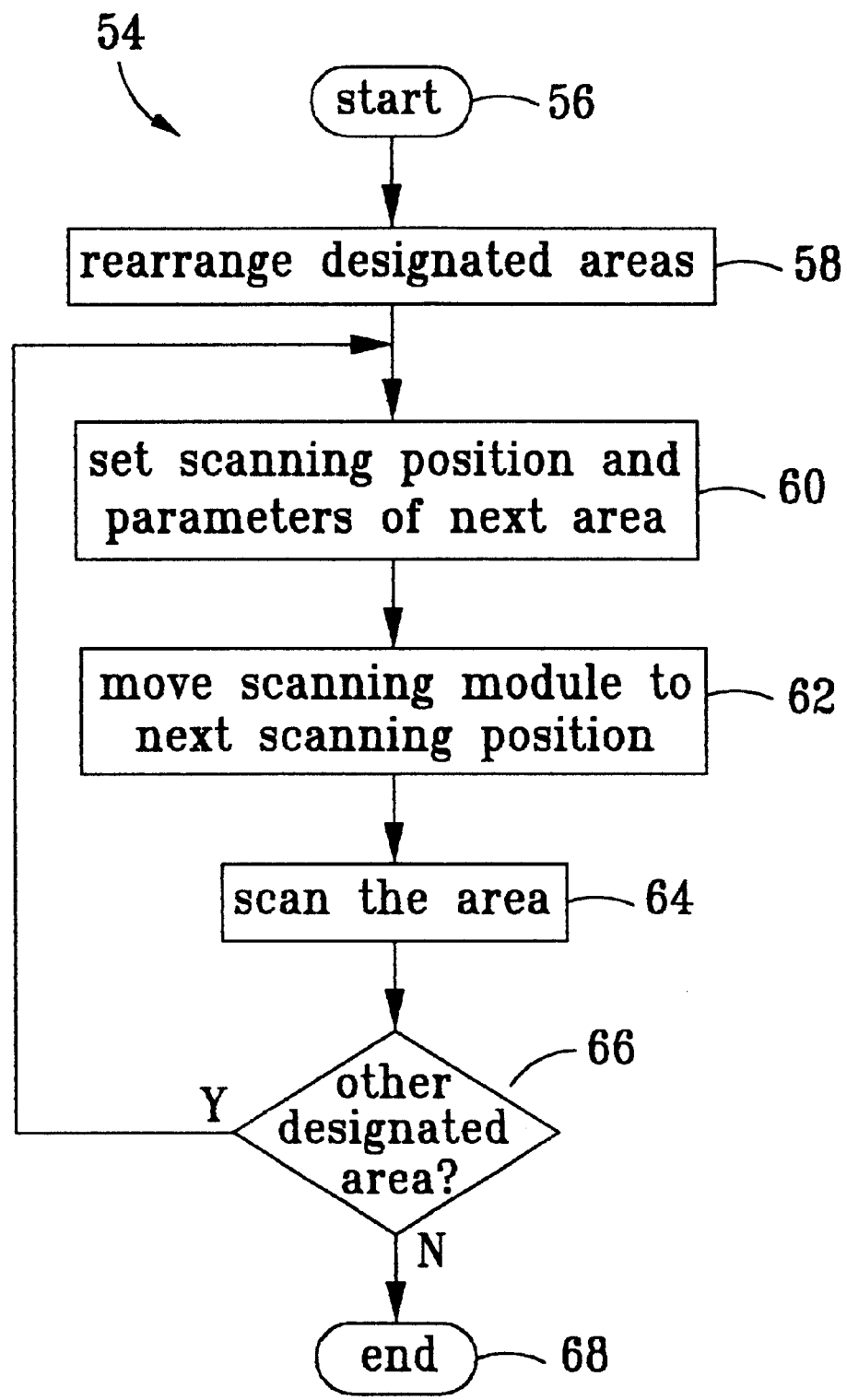
FIG. 4 is a flowchart of another prior art scanning method.

Please refer to FIG. 5 and FIG. 6. FIG. 5 is a function block diagram of an image scanning system 70 according to the present invention. FIG. 6 is a top view of a transparent platform 80 of the image scanning system 70. The image scanning system 70 comprises a scanner 72, a monitor 76 and a computer 74 connected between the scanner 72 and the monitor 76. The computer 74 comprises a memory 102 with a scanning control program 104, an image file 106 and a scanning file 108 stored in it, and a processor 100 for executing the scanning control program 104. The scanner 72 comprises a rectangular transparent platform 80 for placing documents to be scanned. The platform 80 has a front end 82, a rear end 84, a left end 86, and a right end 88. The scanner 72 further comprises a scanning module 78 for scanning documents placed on the platform 80 in a front-to-rear direction. When scanning documents placed on the platform 80, the scanning control program 104 will control the scanning module 78 to make a preview scan over the documents placed on the platform 80, and display a preview image on the monitor 76. After a user designates a plurality of rectangular non-folding areas such as the areas 90, 92, 94 shown in FIG. 6, and set scanning parameters for each designated area such as resolution, contrast, highlight, shadow, scanning mode, image mode, etc., the position and parameter data of each designated area will be recorded in the image file 106 by the scanning control program 104. And then the scanning control program 104 will start using the scanning module 78 to make a normal scan over all the designated areas according the scanning method 110 shown in FIG. 7.

Figure 7:
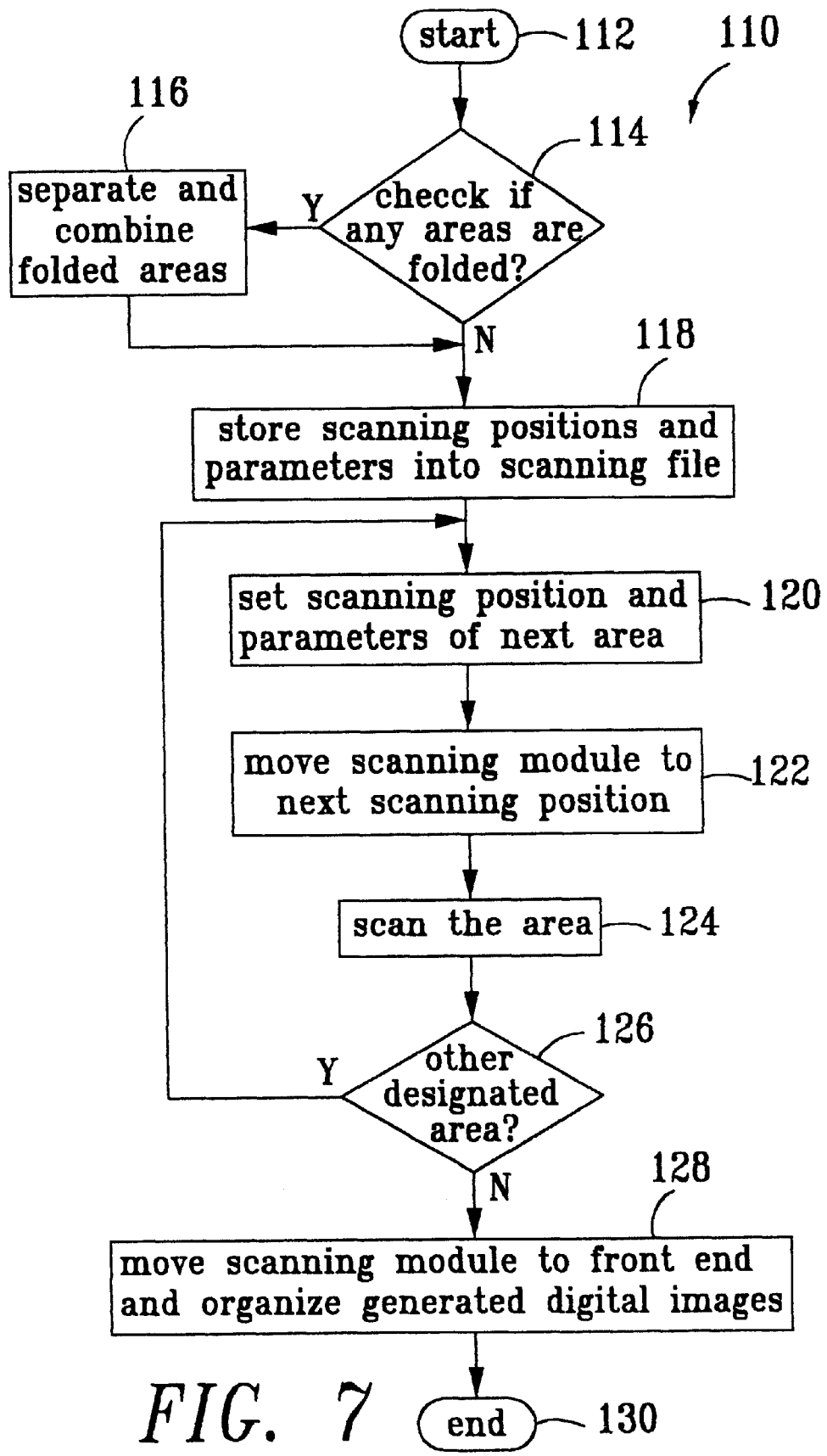
FIG. 7 is a flowchart of a scanning method according to the present invention.

Please refer to FIG. 7. FIG. 7 is a flowchart of a scanning method 110 for scanning a plurality of designated areas of the image scanning system 70 according to the present invention. The scanning method 110 is performed by the scanning control program 104. It comprises the following steps:

Step 112: start scanning a document;

Step 114: check the image file 106 to see if any two or more designated areas 90, 92, 94 are folded along the front-to-rear direction; if not, go to step 118;

Step 116: separate each of the folded designated areas 90, 92 along the left-and-right direction into at least one folding section 90a, 92a and possibly non-folding sections 96a, 96c if there is any, and define all the folded folding sections 90a, 92a as one combined section 96b; if the scanning parameters of the folding sections 90a, 92a of one combined section 96b are different, set the scanning parameters of the combined section 96b according to a predetermined selection method;

Step 118: sequentially store the position data and scanning parameters of each non-folding designated area 94, non-folding section 96a, 96c, and combined section 96b along the front-to-rear direction into the scanning file 108;

Step 120: set the position and scanning parameters of one image to be scanned according to the sequence defined in the scanning file 108;

Step 122: move the scanning module 78 to the position of the next image;

Step 124: scan the image and generate a correspondent digital image;

Step 126: check if the scanning file 108 comprises any image which has not been scanned; if yes, go to step 120;

Step 128: move the scanning module 78 to the front end of the platform 80 and generate a digital image for each folded designated area 90, 92 from the digital images of the non-folding and combined sections 96a, 96c, 96b of the folded designated area 90,92;

Step 130: complete the scanning process.

In step 116, if the resolutions of the folding sections of one combined section are different, the resolution of the combined section is set as the highest resolution of the folding sections. If the scanning modes are different, the scanning mode of the combined section is set as the best scanning mode of the folding sections. Normally, the scanning mode of the scanner 72 includes color scanning, gray level scanning, and linear scanning. The color scanning is usually defined as the best scanning mode and the linear scanning is taken as the worst scanning mode.

As shown in FIG. 6, the designated areas 90 and 92 are folded along a front-to-rear scanning direction. In step 116, the designated areas 90 and 92 are separated into non-folding sections 96a and 96c, and the folding sections of the two designated areas 90 and 92 are combined into one combined section 96b. In step 118, the non-folding sections 96a and 96c, the combined section 96b, and the non-folding designated area 94 will be sequentially stored into the scanning file 108 in a front-to-rear sequence, i.e. 96a, 96b, 96c and 94. When scanning all the designated areas, the scanning control program 104 will scan each of the non-folding sections, combined sections, and non-folding designated areas one by one according to their sequence in the scanning file 108, and generate one digital image for each. When completing the scanning process, the scanning control program 104 will generate a digital image for each of the folded designated areas 90 and 92 from the digital images of the non-folding and combined sections of each of the folded designated areas 90 and 92. That means the digital images of the non-folding section 96a and the left portion of the combined section 96b will be combined to form the digital image of the designated area 90, and the digital images of the right portion of the combined section 96b and the non-folding section 96c will be combined to form the digital image of the designated area 92. The middle portion of the combined section 96b has no use and will be abandoned.

Since the scanning method 110 of the present invention reorganizes the folded designated areas 90 and 92 into non-folding sections 96a and 96c, and combined section 96b, and uses the scanning module 78 to scan each image area one by one along the front-to-rear direction in one pass, the scanning module 78 is not required to be moved back to the front end 82 or to the beginning position of one folded designated area such as the area 92. The above mentioned problems about the two prior art methods 38 and 54 are thus solved. And the scanning speed of the scanning method 110 according to the present invention is much faster than the two prior art methods 38 and 54.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanning method of an image scanning system for scanning a plurality of designated areas, the system comprising a transparent platform having front, rear, left and right ends for placing documents, and a scanning module for scanning the designated areas within the platform in a front-to-rear direction, the scanning method comprising:

(1) checking if any two or more designated areas are folded along a front-to-rear direction; if so, separating each of the folded designated areas along a left-and-right direction into at least one folding section and possibly non-folding sections if there is any, and defining all the folded folding sections as one combined section;

(2) using the scanning module to scan each non-folding designated area, non-folding section and combined section one by one from the front end to the rear end of the transparent platform in only one forward pass even if some designated areas are folded and generating a corresponding digital image for each; and (3) generating a digital image for each folded designated area from the digital images of the non-folding and combined sections of the folded designated area.

2. The scanning method of claim 1 wherein the platform is in a rectangular shape, and each of the designated areas is also in a rectangular shape.

3. The scanning method of claim 1 wherein the image scanning system comprises an image file for storing position data of all the designated areas, and a scanning file for storing position data of each non-folding designated area, non-folding section, and combined section.

4. The scanning method of claim 3 wherein the position data stored in the scanning file are sequentially organized according to the positions of each non-folding designated area, non-folding section, and combined section along the front-to-rear direction.

5. The scanning method of claim 3 wherein the image file further comprises a plurality of user-selected parameters of each designated area including resolution, contrast, highlight, shadow, scanning mode or image mode of the designated area.

6. The scanning method of claim 5 wherein the scanning file further comprises a plurality of user-selected parameters of each non-folding designated area, non-folding section, and combined section copied from the scanning parameters of each corresponding designated area stored in the image file.

7. The scanning method of claim 6 wherein if the resolutions of the folding sections of one combined section are different, the resolution of the combined section is set as the highest resolution of the folding sections.

8. The scanning method of claim 6 wherein if the scanning modes of the folding sections of one combined section are different, the scanning mode of the combined section is set as the best scanning mode of the folding sections.

9. The scanning method of claim 8 wherein the scanning mode can be color scanning, gray level scanning and linear scanning over which the color scanning is the best scanning mode and the linear scanning is the worst scanning mode.

* * * * *